United States Patent Office 3,560,144
Patented Feb. 2, 1971

3,560,144
PYROCHLORE-TYPE TERNARY OXIDES
$Tl_2Ru_2O_7$ AND $Tl_2Ir_2O_7$
Arthur W. Sleight, Wilmington, Del., assignor to E. I. du Pont de Nemours and Company, Wilmington, Del.
No Drawing. Filed June 28, 1968, Ser. No. 741,220
Int. Cl. C01b *15/00*
U.S. Cl. 23—50                                           3 Claims

ABSTRACT OF THE DISCLOSURE

Described and claimed are the two ternary compounds $Tl_2Ru_2O_7$ and $Tl_2Ir_2O_7$, both of which have the pyrochloretype structure. The compounds are produced from mixtures of the binary oxides, $Tl_2O_3$ and $RuO_2$ or $IrO_2$, respectively, in substantially the stoichiometric ratios at temperatures of 400° C. to 1,400° C. The compounds are useful in electrical applications.

BACKGROUND OF THE INVENTION

(1) Field of the invention

This invention relates to, and has as its principal object provision of, the two compounds $Tl_2Ru_2O_7$ and $Tl_2Ir_2O_7$, useful in electrical resistors.

(2) Description of the prior art

Over one hundred mixed oxides are known to have the pyrochlore structure. Consequently, this summary is not exhaustive insofar as compounds with this structure are concerned. Those most closely related to $Tl_2Ru_2O_7$ and $Tl_2Ir_2O_7$ are, however, believed included. Ternary oxides of the type $R_2M_2O_7$ with the pyrochlore structure are known where R is a rare earth and M is Ti, Zr, Hf, Tc, Re, Ir, Ge, and Sn as well as where R is Cd or Hg and M is Nb, Re, Ta or Sb. The defect pyrochlores, $AgSbO_3$, $PbRuO_3$, $PbTcO_3$, $PbIrO_3$, and $BiRhO_3$, are also known. Recently, the pyrochlore phase $Tl_2Pt_2O_7$ has been reported by Hoekstra and Siegel, Inorganic Chemistry 7, 141 (1968). $Bi_2Ru_2O_7$ has the pyrochlore structure and has been found to be useful in resistor compositions: see the copending, coassigned, U.S. Pat. application of Hoffman, Ser. No. 869,351, filed Oct. 24, 1969, as a continuation-in-part of Ser. No. 748,952, filed July 31, 1968, as a continuation-in-part of Ser. No. 701,016, filed Jan. 26, 1968, the latter two applications now abandoned. Compositions containing $Tl_2O_3$ and $RuO_2$ are also known to be useful as resistors: see U.S. Pat. 3,352,797.

DESCRIPTION OF THE INVENTION

The novel compounds of this invention are two in number, having the formula $Tl_2X_2O_7$ where X is Ru or Ir. Both compounds have the pyrochlore-type structure.

The two new compounds are prepared from $Tl_2O_3$ and $RuO_2$ or $IrO_2$, respectively. The latter two oxides may be in either crystalline or amorphous form, the thallium oxide apparently being known only in crystalline form. In practice, the compounds are prepared by mixing the respective reactants and grinding them together with a mortar and pestle or similar device. The reaction mixtures are then simply heated together in an acceptable inert container. When a closed system is employed, the stoichiometric molar ratios are 1:2 of $Tl_2O_3$:other oxide. When open systems are used, however, a slight excess of $Tl_2O_3$, i.e., a mole ratio of around 1.05:2, can be employed since $Tl_2O_3$ becomes significantly volatile at around 600° C. and rapidly volatile around 700° C.

The lower temperature limit for preparing these compounds is determined by the reactivity of the reactants and is in the neighborhood of around 400° C. The upper temperature limit is around 700° C. in an open system but may be extended to well over 1,000° C. in a closed system. The preferred temperature range, however, is about 500–700° C.

A closed system is useful since it prevents the loss of $Tl_2O_3$ by volatilization. It is sufficient that the pressure equal the vapor pressure of $Tl_2O_3$. At 700° C., for example, 1 atmosphere or autogenous pressure is sufficient. Higher pressures, particularly at higher temperatures, can, of course, be employed.

In an open system, the atmosphere is largely immaterial and can be oxygen, air, or any inert gas. Oxygen, however, is preferred since it will oxidize any trace of iridium or ruthenium present.

The minimum time required to prepare $Tl_2Ru_2O_7$ and $Tl_2Ir_2O_7$ depends on the reactivity of the reactants, the degree of mixing, the temperature of the reaction, and, to a lesser extent, the reaction pressure. Thus, at 1,000° C. in a closed system, five minutes is sufficient while at 400° C. ten hours may be required to reach the same degree of reaction. In open systems there will be slow volatilization (mainly of $Tl_2O_3$) so that a practical upper limit is about 24 hours.

The reaction preparing the compounds of the invention is preferably carried out in a gold reactor. Other inert metals, such as precious metals, and ceramics can be used if desired, however.

EMBODIMENT OF THE INVENTION

There follow some nonlimiting examples illustrating the preparation of the compounds of the invention in more detail. In the examples, percentages are by weight.

Example 1

Preparation of $Tl_2Ru_2O_7$. — Thallium sesquioxide, $Tl_2O_3$, and ruthenium dioxide $RuO_2$, were weighed out in amounts of 0.6525 g. and 0.3802 g., respectively and the two oxides were mixed by grinding them together in an agate mortar and pestle. The mixture was placed in a gold tube (5" long, 3/8" diameter, .010" wall) which had been sealed at one end by welding. The other end of this tube was then also welded shut.

The sealed gold tube was placed in a pressure vessel. The pressure was increased to 3,000 atmospheres, and the temperature was increased to 700° C. These conditions were held for eight hours. The pressure vessel and tubes were cooled quickly to room temperature and the pressure was released.

On opening the gold tube, black, polycrystalline $Tl_2Ru_2O_7$ was recovered. An X-ray diffraction pattern of this powder could be completely interpreted on the basis of a face centered cubic unit cell with an edge of 10.196±.001 A. The data further indicated that the crystal structure was undoubtedly of the pyrochlore type. Since no impurities were detected, purification was unnecessary.

Example 2

Preparation of $Tl_2Ir_2O_7$.—Tallium sesquioxide and iridium dioxide, $IrO_2$, were weighed out in amounts of 0.5075 g. and 0.4982 g., respectively, and a preparative procedure otherwise identical in all respects with that of Example 1 was carried out.

Black, polycrystalline $Tl_2Ir_2O_7$ was recovered from the gold tube. An X-ray powder diffraction pattern of the product showed a face-centered cubic unit cell with an edge of 10.21±.01A. Although some impurities were noted, it was apparent that a phase with the pyrochlore structure was present in better than 90% yield.

Example 3

Preparation of $Tl_2Ir_2O_7$ under oxygen.—Thallium sesquioxide and iridium dioxide were weighed out in amounts of 2.3979 g. and 2.2420 g., respectively, and were intimately mixed as in Example 1. The mixture was placed in an open gold container, and the container was inserted in a tube furnace with about one atmosphere of oxygen flowing very slowly through the tube. The furnace temperature was raised to 650° C. and held for 12 hours. The furnace was cooled, and black, polycrystalline $Tl_2Ir_2O_7$ was recovered. An X-ray powder diffraction pattern of this product was nearly identical to that obtained in Example 2.

*Analysis.*—Calcd. for $Tl_2Ir_2O_7$ (percent): Tl, 45.16; Ir, 42.47; O, 12.4. Found (percent): Tl, 48.04; Ir, 42±2; O, 12.7.

Example 4

Preparation of $Tl_2Ru_2O_7$ under oxygen.—Thallium sesquioxide and ruthenium dioxide were weighed out in amounts of 2.3979 g. and 1.3307 g., respectively, and a preparative procedure otherwise identical to that of Example 3 was carried out. The black polycrystalline $Tl_2Ru_2O_7$ recovered gave an X-ray powder diffraction pattern essentially identical to that obtained in Example 1.

*Analysis.*—Calcd. for $Tl_2Ir_2O_7$ (percent): Tl, 45.16; Ru, 27.96; O, 15.5. Found (percent): Tl, 56.11; Ru, 28.7, 29.0; O, 15.9.

Both $Tl_2Ru_2O_7$ and $Tl_2Ir_2O_7$ are useful in electrical resistor compositions of the type shown, for example, by D'Andrea, U.S. Pat. 2,924,540, and Dumesnil, U.S. Pat. 3,052,573. See also the above-mentioned Hoffman application Ser. No. 701,016. When used in such compositions, the present novel compounds have an advantage in that they have very low thermal coefficients of resistance (TCR), i.e., the electrical resistivity of the compositions changes very little as a function of temperature.

Resistors made with $Tl_2Ru_2O_7$ and $Tl_2Ir_2O_7$ are also particularly resistant to changes in humidity. Resistance to humidity can be tested by exposing the resistor composition to 95% relative humidity at 85° C. overnight, and determining the change in resistivity.

Because of its high resistivity, $Tl_2Ir_2O_7$ is the preferred product of the two compounds claimed.

Tests using the two compounds of this invention in gold-containing resistors of the type described in application Ser. No. 701,016 are given in the following table. The compositions set forth in the table were made as follows:

The pyrochlore, glass, and gold phases were mixed together by grinding and then into a paste by mixing with 20–30% by volume of β-terpineol. The paste was screen-printed on a ceramic body, and the system was heated slowly to 200° C. and then fired at about 750° C. for about ten minutes.

TABLE

| Composition of resistor | Resistance per square | TCR [a] +25 to +125° C., p.p.m.[c] | TCR +25 to −75° C., p.p.m. |
|---|---|---|---|
| 45% $Tl_2Ir_2O_7$, 10% Au, 45% glass [b] | 1.26 meg-ohm | −260 | −382 |
| 35% $Tl_2Ir_2O_7$, 20% Au, 45% glass | .944 meg-ohm | −75 | −15 |
| 45% $Tl_2Ru_2O_7$, 10% Au, 45% glass | 1.30 k-ohm | +522 | +410 |
| 35% $Tl_2Ru_2O_7$, 20% Au, 45% glass | 805 ohm | +810 | +480 |

[a] TCR=Thermal coefficient of resistance.
[b] The glass used is 65% PbO, 26% $SiO_2$ and 10% $B_2O_3$.
[c] p.p.m.=Parts per million.

Since obvious modifications and equivalents in the invention will be evident to those skilled in the art, I propose to be bound solely by the appended claims.

The embodiments of the invention in which an exclusive property or privilege is claimed are defined as follows:

1. A compound of the formula $Tl_2X_2O_7$ wherein X is Ru or Ir, said compound having the pyrochlore structure.

2. The compound of claim 1 wherein X is Ru, $Tl_2Ru_2O_7$.

3. The compound of claim 1 wherein X is Ir, $Tl_2Ir_2O_7$.

References Cited

UNITED STATES PATENTS 3,352,797   11/1967   Kim _____ 252—514

OTHER REFERENCES

Hoekstra et al.: "Synthesis of Thallium Platinate at High Pressure," Inorganic Chemistry, January-June (1968), pp. 141–145; paper presented at 153rd National Meeting of American Chemical Society, Miami Beach, Fla., April 1967.

OSCAR R. VERTIZ, Primary Examiner

H. S. MILLER, Assistant Examiner

U.S. Cl. X.R.

23—15